(12) United States Patent
Kato et al.

(10) Patent No.: US 11,673,625 B2
(45) Date of Patent: Jun. 13, 2023

(54) SHIFT DEVICE

(71) Applicant: SUZUKI MOTOR CORPORATION, Hamamatsu (JP)

(72) Inventors: Kohei Kato, Hamamatsu (JP); Takatoshi Maemori, Hamamatsu (JP); Tatsushi Uchiyama, Hamamatsu (JP); Hiroyasu Inohara, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 17/678,896

(22) Filed: Feb. 23, 2022

(65) Prior Publication Data

US 2022/0274672 A1 Sep. 1, 2022

(30) Foreign Application Priority Data

Mar. 1, 2021 (JP) .............................. JP2021-031521

(51) Int. Cl.
*B62M 25/06* (2006.01)
*F16H 59/02* (2006.01)
(Continued)

(52) U.S. Cl.
CPC ............ *B62M 25/06* (2013.01); *B62M 25/08* (2013.01); *F16H 59/02* (2013.01); *F16H 59/044* (2013.01); *F16H 2059/0234* (2013.01)

(58) Field of Classification Search
CPC ...... B62M 25/02; B62M 25/06; B62M 25/08; F16H 59/02; F16H 59/04; F16H 59/044; F16H 2059/0234; G05G 1/30; G05G 1/44
See application file for complete search history.

(56) References Cited

U.S. PATENT DOCUMENTS 6,308,797 B1 * 10/2001 Hacker .................. B62M 25/06
180/230
6,394,214 B1 * 5/2002 Hahm .................... B62M 25/06
180/230
(Continued)

FOREIGN PATENT DOCUMENTS

DE 19511761 A1 * 10/1996 .............. B62J 25/00
DE 10 2011 086 243 A1 5/2013
(Continued)

OTHER PUBLICATIONS

Machine translation of DE 102011086243 A1 obtained on Dec. 8, 2022.*
(Continued)

*Primary Examiner* — Adam D Rogers
(74) *Attorney, Agent, or Firm* — Stein IP, LLC (57) ABSTRACT

There is provided a shift device for a straddle-type vehicle that is configured to cause a transmission device to perform a shift change in accordance with rotation of a shift shaft. The shift device includes: a shift lever provided with an operation portion that is configured to receive a shift operation; a shift sensor provided on the shift shaft so as to be integrally rotatable with the shift shaft; and a shift rod that couples the shift lever and the shift sensor. The shift sensor is configured to detect the shift operation on the shift lever in accordance with a movement of the shift rod. The operation portion and the shift sensor are positioned at the same side in a manner of sandwiching the shift rod in a vehicle side view.

6 Claims, 7 Drawing Sheets

(51) Int. Cl.
*F16H 59/04* (2006.01)
*B62M 25/08* (2006.01)

(56) References Cited

U.S. PATENT DOCUMENTS

| | | | | |
|---|---|---|---|---|
| 7,896,119 | B2 * | 3/2011 | Suzuki | B62M 7/02 |
| | | | | 180/230 |
| 8,051,739 | B2 * | 11/2011 | Nishiura | B62M 25/06 |
| | | | | 280/294 |
| 9,022,163 | B2 * | 5/2015 | Nakamura | B62M 25/06 |
| | | | | 180/336 |
| 10,718,424 | B2 * | 7/2020 | Takahashi | F16H 63/3009 |
| 10,876,626 | B2 * | 12/2020 | Terai | F16H 61/24 |
| 10,953,954 | B2 * | 3/2021 | Takahashi | F16H 61/32 |
| 11,022,211 | B2 * | 6/2021 | Takahashi | F16H 63/46 |
| 11,466,771 | B2 * | 10/2022 | Matsumoto | F16H 61/2807 |
| 2013/0133457 | A1 | 5/2013 | Sakamoto et al. | 74/473.12 |
| 2015/0152964 | A1 | 6/2015 | Tanaka | F16H 63/14 |
| 2018/0045300 | A1 | 2/2018 | Takahashi | |
| 2022/0275862 | A1 * | 9/2022 | Kato | F16H 59/044 |
| 2022/0340232 | A1 * | 10/2022 | Tsai | F16H 61/32 |

FOREIGN PATENT DOCUMENTS

| | | | |
|---|---|---|---|
| DE | 10 2017 007 052 A1 | 2/2018 | |
| JP | 6107621 B2 * | 4/2017 | F16H 59/02 |

OTHER PUBLICATIONS

Extended European Search Report dated Jul. 15, 2022, issued by the European Patent Office in corresponding application EP 22158172.1.

* cited by examiner

SHIFT DEVICE

CROSS-REFERENCE TO RELATED APPLICATIONS

This application is based on Japanese Patent Application No. 2021-031521 filed on Mar. 1, 2021, the contents of which are incorporated herein by way of reference.

TECHNICAL FIELD

The present invention relates to a shift device.

BACKGROUND

As a shift device for a straddle-type vehicle, there is known a shift device employing a quick shift that can detect a shift operation by a driver and perform a shift change without performing a clutch operation (for example, see Patent Literature 1). In the shift device described in Patent Literature 1, one end of a shift shaft protrudes from an upper side surface of a crankcase, and a shift lever extends rearward from a lower side surface of the crankcase. An upper end of a shift rod is coupled to one end of the shift shaft via a link arm, and a lower end of the shift rod is coupled to an intermediate position of the shift lever. A shift sensor is integrally provided on the shift rod that is long in an upper-lower direction, and a shift operation in accordance with an operation load applying to the shift rod is detected.
Patent Literature 1: Japanese Patent No. 6107621

In order to provide the shift sensor integrally with the shift rod, it is necessary to ensure a sufficient length of the shift rod. Therefore, it is difficult to provide the shift sensor depending on a layout of the straddle-type vehicle.

The present invention has been made in view of the above circumstances, and an object of the present invention is to provide a compact shift device in which a shift sensor can be disposed even in a layout in which a sufficient length of a shift rod cannot be ensured.

SUMMARY

There is provided a shift device for a straddle-type vehicle that is configured to cause a transmission device to perform a shift change in accordance with rotation of a shift shaft. The shift device includes: a shift lever provided with an operation portion that is configured to receive a shift operation; a shift sensor provided on the shift shaft so as to be integrally rotatable with the shift shaft; and a shift rod that couples the shift lever and the shift sensor. The shift sensor is configured to detect the shift operation on the shift lever in accordance with a movement of the shift rod. The operation portion and the shift sensor are positioned at the same side in a manner of sandwiching the shift rod in a vehicle side view.

DESCRIPTION OF EMBODIMENTS

A shift device according to an aspect of the present invention causes a transmission device to perform a shift change in accordance with rotation of a shift shaft of a straddle-type vehicle. The shift lever is provided with an operation portion that receives a shift operation, a shift sensor is provided on the shift shaft so as to be integrally rotatable with the shift shaft, and the shift lever and the shift sensor are coupled to each other via a shift rod. The shift sensor detects a shift operation on the shift lever in accordance with a movement of the shift rod. The shift sensor has a function of detecting the shift operation, and the shift sensor functions as a link arm that couples the shift shaft and the shift rod. Even in a layout in which a sufficient length of the shift rod cannot be ensured, the shift sensor can be provided in the shift device. Since the operation portion and the shift sensor are positioned at the same side in a manner of sandwiching the shift rod in a vehicle side view, the shift lever and the shift rod are disposed in a compact manner in the same space, and the shift device is reduced in size. In addition, since the shift sensor is provided instead of a link arm, the number of components is suppressed from increasing, and the shift sensor is easily attached.

Embodiment

Figure 1:
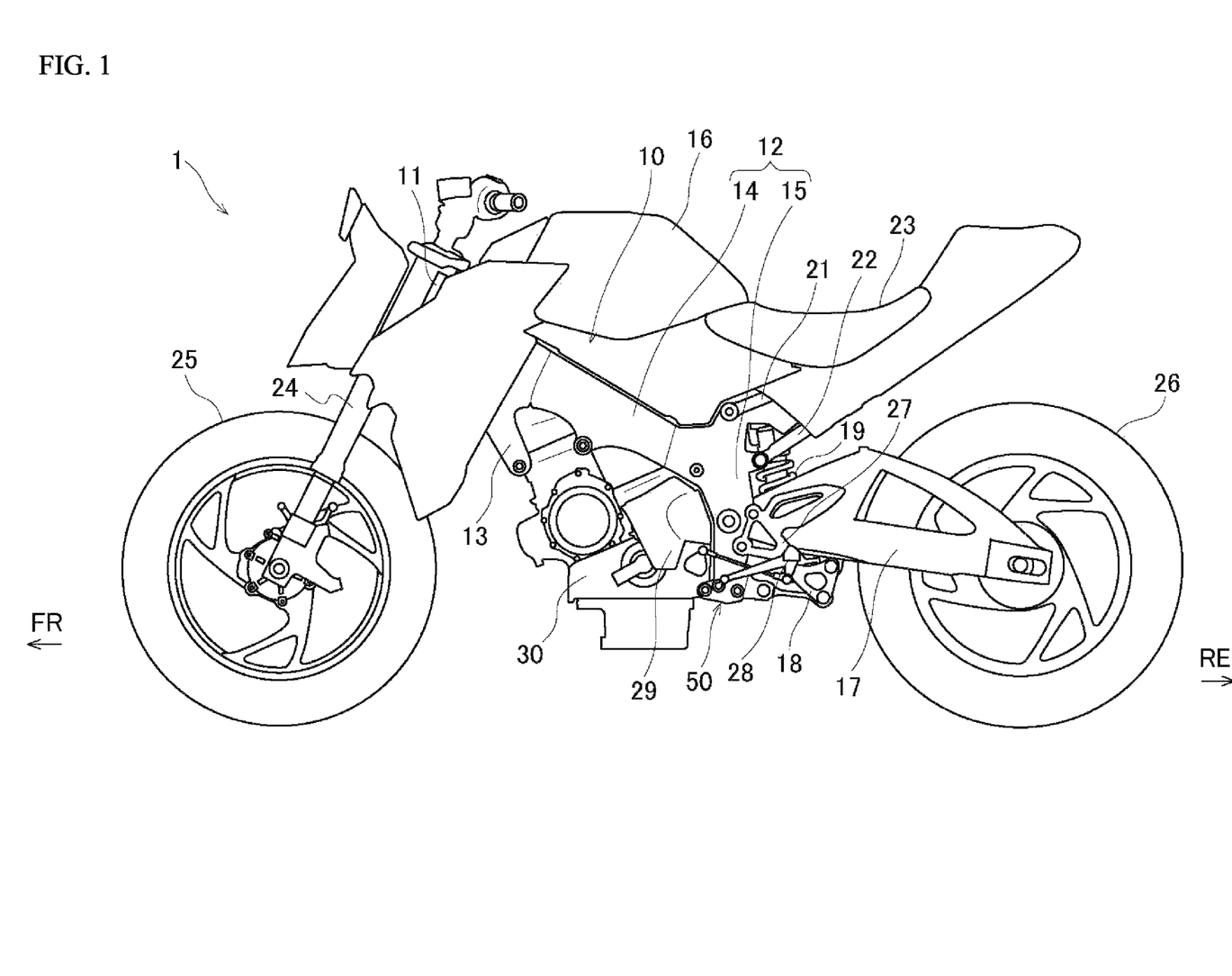
FIG. 1 is a left side view showing a straddle-type vehicle according to the present embodiment.
Figure 2:
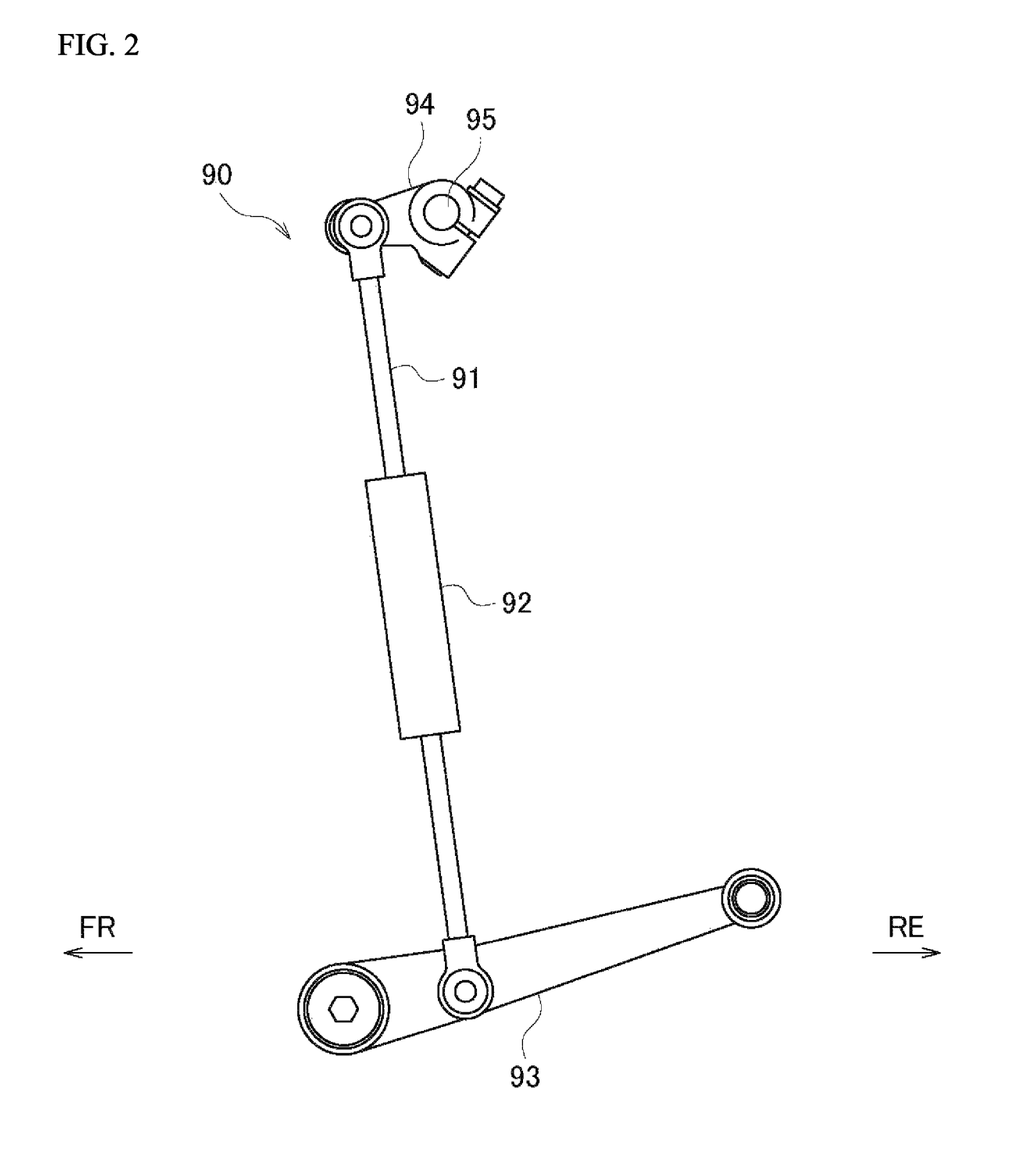
FIG. 2 is a left side view showing a shift device according to a comparative example.

Hereinafter, a present embodiment will be described in detail with reference to the accompanying drawings. FIG. 1 is a left side view showing a straddle-type vehicle according to the present embodiment. FIG. 2 is a left side view showing a shift device according to a comparative example. In the following drawings, an arrow FR indicates a vehicle front side, an arrow RE indicates a vehicle rear side, an arrow L indicates a vehicle left side, and an arrow R indicates a vehicle right side.

As shown in FIG. 1, a straddle-type vehicle 1 is configured by mounting various components such as an engine 30 and an electrical system on a twin spar type vehicle body frame 10 formed by aluminum casting. The vehicle body frame 10 includes a pair of main frames 12 that are branched off from a head pipe 11 to the left and right and extend rearward, and a pair of down frames 13 that are branched off from the head pipe 11 to the left and right and extend downward. A rear portion of the engine 30 is supported by the pair of main frames 12, and a front portion of the engine 30 is supported by the pair of down frames 13. Since the engine 30 is supported by the vehicle body frame 10, rigidity of the entire vehicle is ensured.

A front portion of the main frame 12 serves as a tank rail 14 located above the engine 30, and a fuel tank 16 is supported by the tank rail 14. A rear portion of the main frame 12 serves as a body frame 15 located at a rear side of the engine 30, and a swing arm 17 is swingably supported at a substantially intermediate position in an upper-lower direction of the body frame 15. The swing arm 17 is coupled to an upper portion of the body frame 15 via a link plate 18 and a rear suspension 19. A seat rail 21 and a back stay 22 extend rearward from the upper portion of the body frame 15, and a rider seat 23 is supported on the seat rail 21.

A pair of front forks 24 are supported by the head pipe 11, and a front wheel 25 is rotatably supported by lower ends of the front forks 24. The swing arm 17 extends rearward from the body frame 15, and a rear wheel 26 is rotatably supported by a rear end of the swing arm 17. The engine 30 is coupled to the rear wheel 26 via a chain drive type transmission mechanism, and power of the engine 30 is transmitted to the rear wheel 26 via the transmission mechanism. Footrests 28 are provided on the body frame 15 via footrest brackets 27. A shift device 50 is provided between a lower portion of the engine 30 and the left footrest 28.

As shown in the comparative example in FIG. 2, when three major axes of the engine are arranged in a triangular shape, an arrangement space of a shift device 90 can be ensured in a height direction. In such an engine, a shift sensor 92 can be attached to a shift rod 91 by ensuring a length of the shift rod 91 of the shift device 90 in a vertical direction. A shift lever 93 is coupled to a lower end of the shift rod 91, and a shift shaft 95 is coupled to an upper end of the shift rod 91 via a link arm 94. A shift operation of the shift lever 93 is transmitted to the shift shaft 95, and the shift shaft 95 is rotated to cause the transmission mechanism to perform a shift change.

Figure 3:
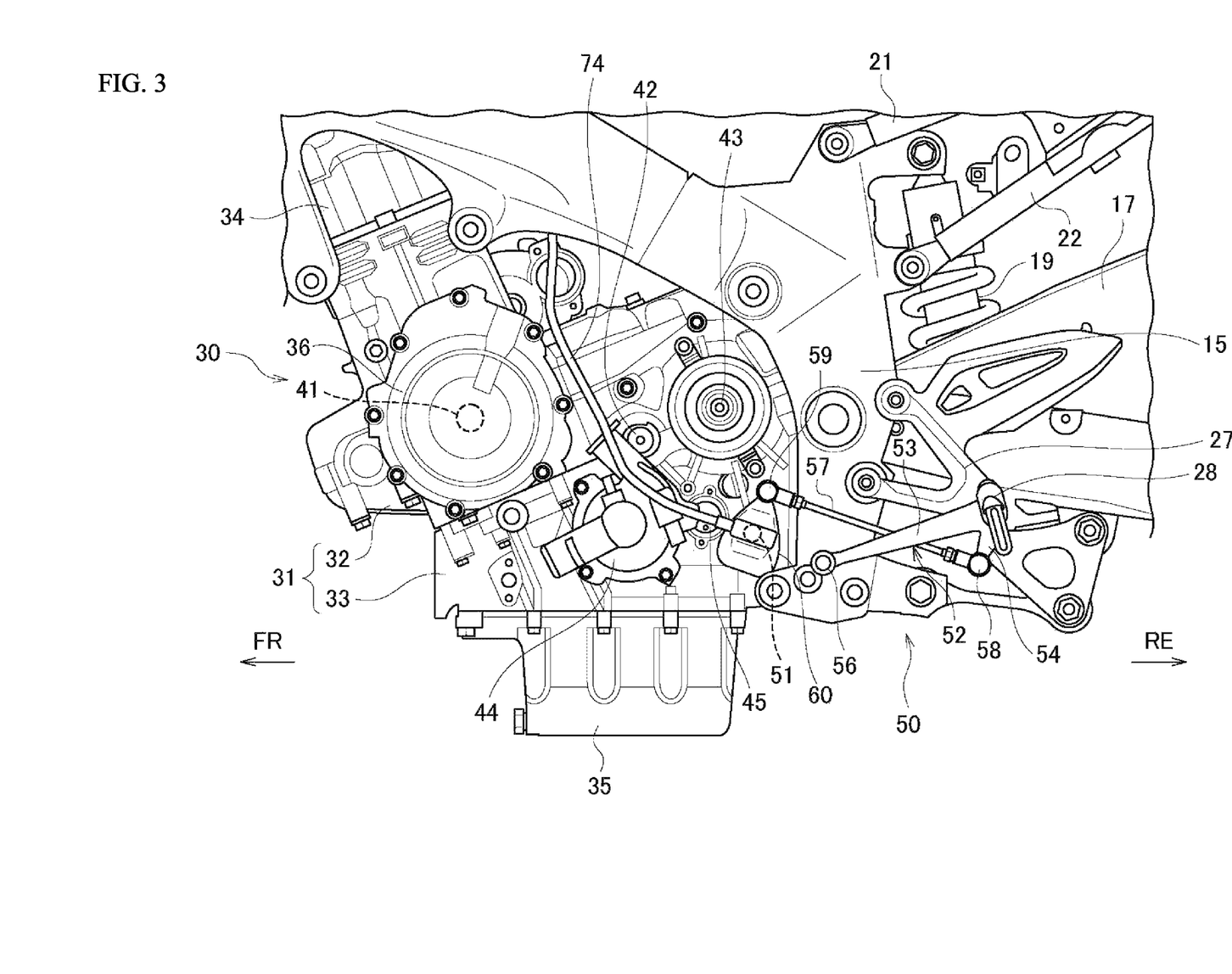
FIG. 3 is a left side view showing a periphery of an engine according to the present embodiment.

In the engine 30 according to the present embodiment, since the three major axes are arranged in a front-rear direction, a shift rod 57 of the shift device 50 cannot be directed vertically, and a sufficient length cannot be ensured (see FIG. 3). The body frame 15 is positioned at a rear side of the engine 30, and the shift rod 57 needs to extend rearward in order to attach a shift sensor on the shift rod 57. When the shift rod 57 is extended, the entire shift device 50 is increased in size, and it is difficult to ensure a minimum ground clearance, a bank angle, and the like. Therefore, the shift rod 57 is shortened by using a shift sensor 60 having a link arm shape in the present embodiment, and miniaturization is achieved by a concentrated arrangement of respective members of the shift device 50.

Figure 4:
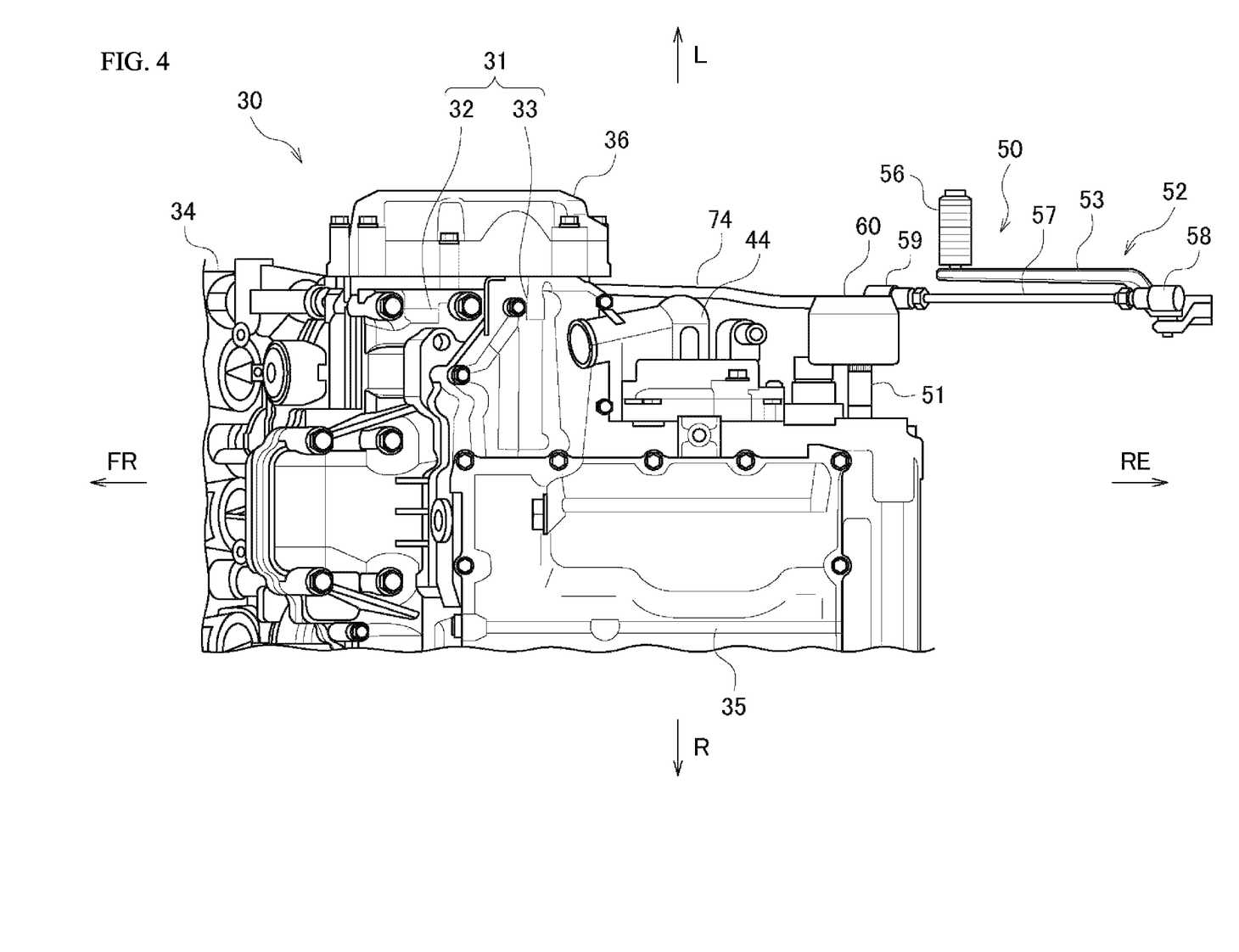
FIG. 4 is a bottom view showing the periphery of the engine according to the present embodiment.

An arrangement configuration of the shift device will be described with reference to FIGS. 3 and 4. FIG. 3 is a left side view showing a periphery of the engine according to the present embodiment. FIG. 4 is a bottom view showing a periphery of the engine according to the present embodiment. FIGS. 3 and 4 show a state where a sprocket cover is removed from the engine.

As shown in FIGS. 3 and 4, the engine 30 includes a crankcase 31 having an upper-lower divided structure that includes an upper case 32 and a lower case 33. The upper case 32 is integrated with a cylinder, and a cylinder head 34 and a cylinder head cover (not shown) are attached to an upper portion of the upper case 32. A valve gear (not shown) for operating intake and exhaust valves is accommodated inside the cylinder head 34 and the cylinder head cover. An oil pan 35 that stores oil for lubrication and cooling is attached to a lower portion of the lower case 33. A magneto cover 36 that covers a magneto (not shown) from a side is attached to a left side surface of the crankcase 31.

A crankshaft 41 is disposed inside the magneto cover 36, and a counter shaft 42 and a drive shaft 43 are disposed in parallel with the crankshaft 41 at a rear side of the crankshaft 41. In this manner, the crankshaft 41, the counter shaft 42, and the drive shaft 43 are arranged side by side in the front-rear direction. A water pump 44 is disposed below the counter shaft 42, and a shift cam 45 is disposed below the drive shaft 43 in parallel with the drive shaft 43. Further, a shift shaft 51 is disposed at a rear side of the shift cam 45 in parallel with the shift cam 45, and the shift sensor 60 is attached to one end of a shift shaft 51 protruding from a left side surface of the lower case 33 so as to be integrally rotatable with the shift shaft 51.

The shift sensor 60 is disposed below the drive shaft 43 and is disposed between the water pump 44 and the body frame 15. The shift sensor 60 is positioned above a lower end of the water pump 44 and is positioned inside the magneto cover 36 in a vehicle width direction (particularly, see FIG. 4). Since the water pump 44 is disposed in a manner of covering the shift sensor 60 from the front side, the shift sensor 60 is effectively protected by the water pump 44 from flying objects such as flying stones from the front side. A lead wire 74 extends obliquely upward from a front surface of the shift sensor 60, and the lead wire 74 is not entangled with an operation portion 56 of a shift lever 52 at a rear side of the shift sensor 60.

The footrest bracket 27 is attached to a rear edge of the body frame 15, and the shift lever 52 is attached to the footrest bracket 27 in a manner of being coaxial with the footrest 28. The shift lever 52 is formed with a long arm 53 and a short arm 54 so as to be a substantially L shape in a side view. An attachment portion 55 (see FIG. 5) that is swingably supported by the footrest bracket 27 is formed at a bent portion of the shift lever 52. The long arm 53 extends obliquely downward toward a front side from the attachment portion 55, and the operation portion 56 that receives a shift operation is provided at a tip end of the long arm 53. A tip end side of the long arm 53 overlaps with the body frame 15 in a vehicle side view.

The short arm 54 extends substantially downward from the attachment portion 55, and a rear end of the shift rod 57 is coupled to a tip end of the short arm 54 via a joint 58. The shift rod 57 extends obliquely upward toward the front side from the joint 58 and crosses an outer side of the body frame 15 in the vehicle width direction. An upper portion of the shift sensor 60 is coupled to a front end of the shift rod 57 via a joint 59. The shift sensor 60, the shift lever 52, and the shift rod 57 are positioned below the drive shaft 43 and the swing arm 17 and above the lower end of the water pump 44. In this manner, respective members of the shift device 50 are disposed in a compact manner at a vehicle lower side.

In the shift device 50, when the shift lever 52 is operated by a driver, the shift shaft 51 is integrally rotated by a predetermined angle with the shift sensor 60 via the shift rod 57. The rotation of the shift shaft 51 is transmitted to the shift cam 45, and the shift cam 45 is rotated by a predetermined angle, so that a shift fork (not shown) changes a combination of transmission gears of the counter shaft 42 and the drive shaft 43 so as to perform a shift change. At this time, a shift operation on the shift lever 52 in accordance with a movement of the shift rod 57 is detected by the shift sensor 60, and the shift change can be performed without performing a clutch operation.

Figure 5:
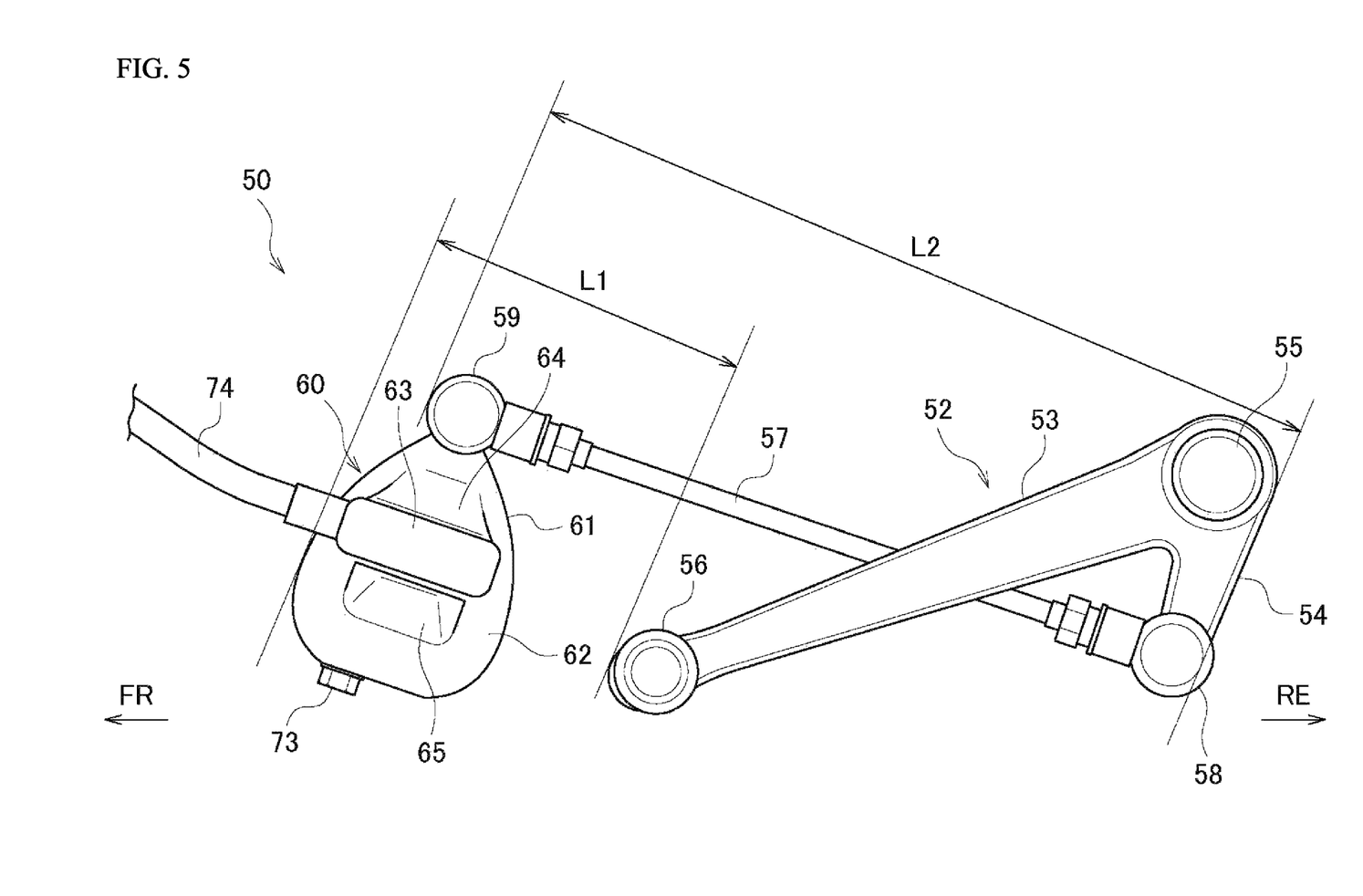
FIG. 5 is a left side view showing a shift device according to the present embodiment.
Figure 6:
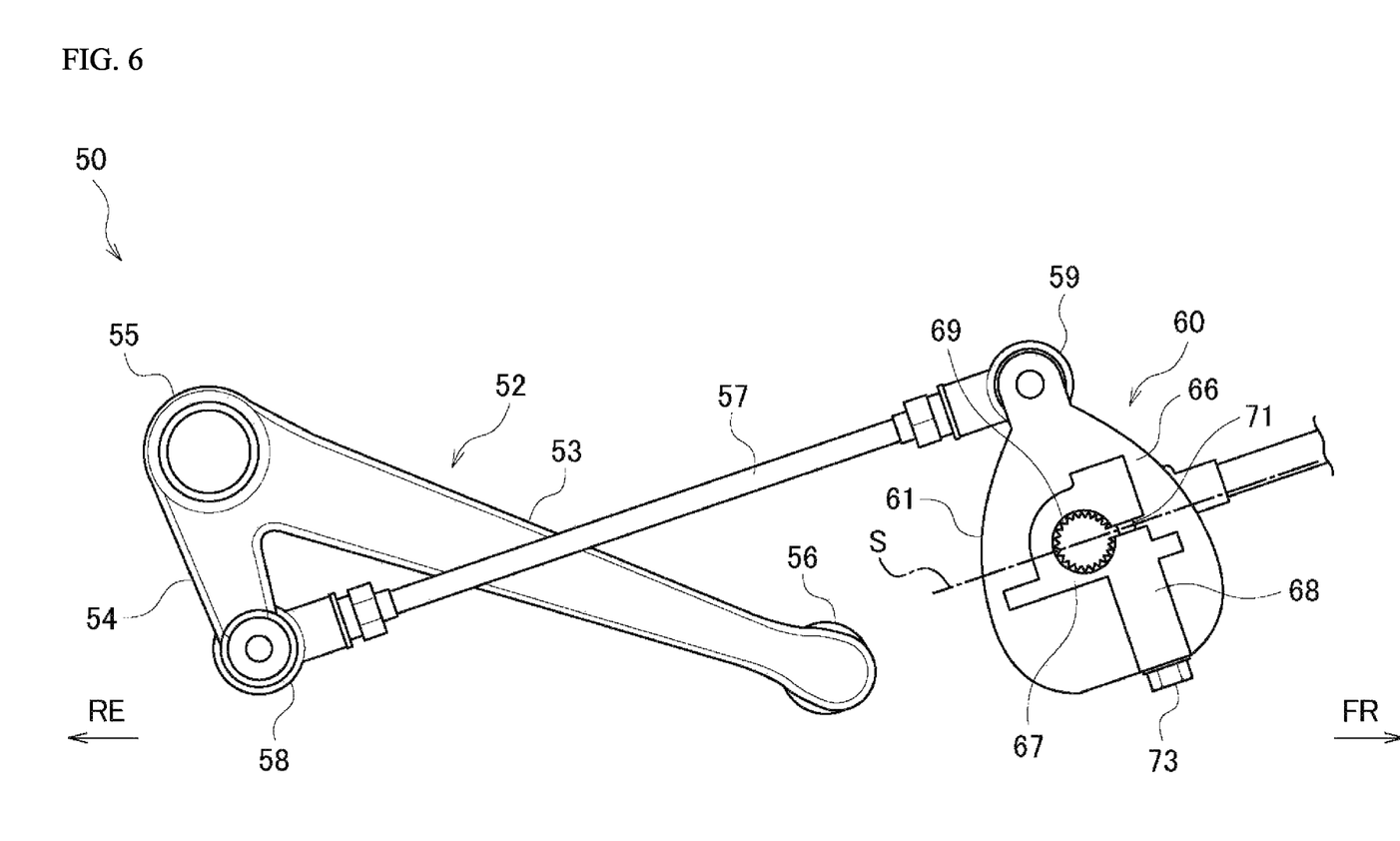
FIG. 6 is a right side view showing the shift device according to the present embodiment.
Figure 7:
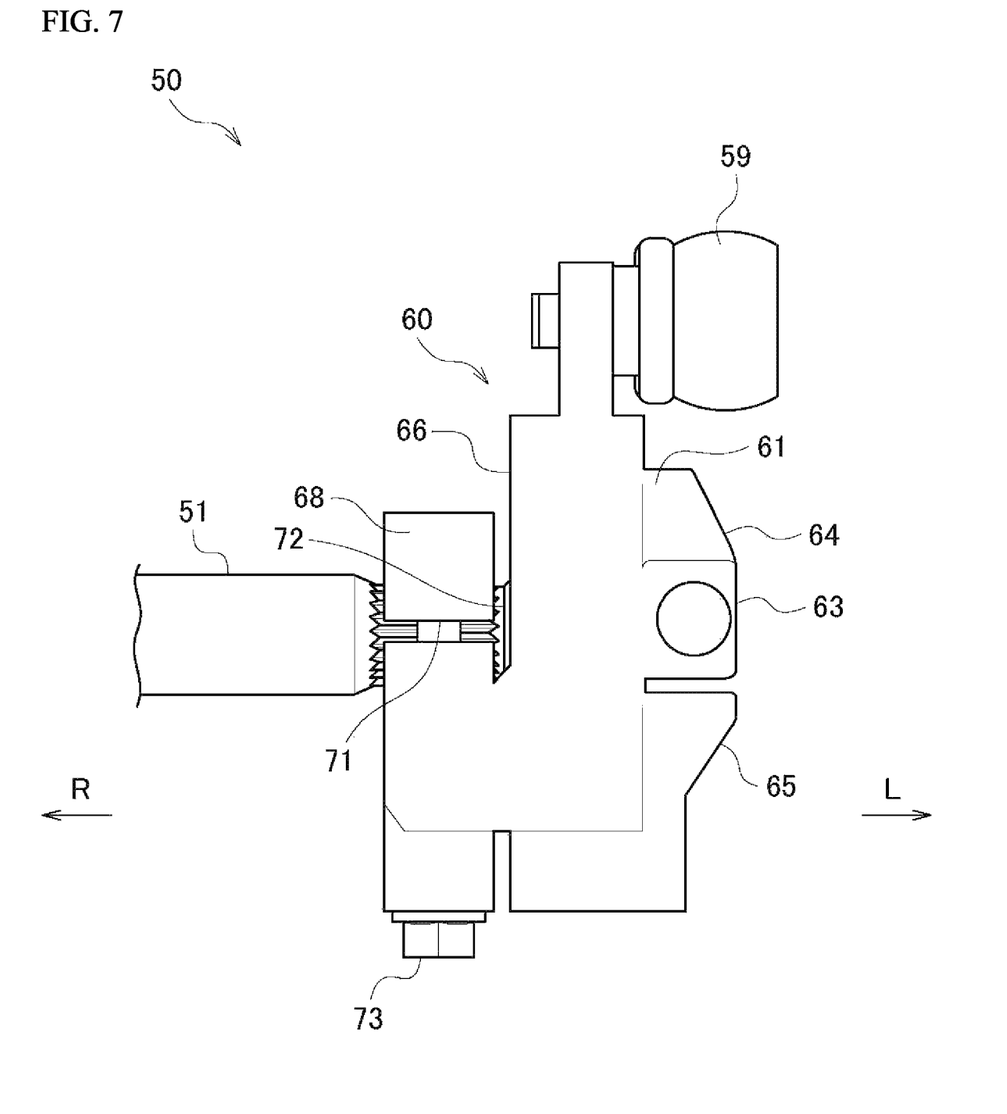
FIG. 7 is a front view showing a shift shaft according to the present embodiment.

A detailed configuration of the shift device will be described with reference to FIGS. 5 to 7. FIG. 5 is a left side view showing the shift device according to the present embodiment. FIG. 6 is a right side view showing the shift device according to the present embodiment. FIG. 7 is a front view showing the shift shaft according to the present embodiment.

As shown in FIGS. 5 and 6, the shift device 50 includes the shift sensor 60 that detects a shift operation on the shift lever 52. A sensor main body 61 of the shift sensor 60 is formed into a triangular shape with rounded corners in a side view. A Hall integrated circuit (IC) 63 serving as a detection portion is provided on an outer side surface 62 at an outer side in the vehicle width direction of the sensor main body 61, and a pair of protection portions 64 and 65 are provided in a manner of sandwiching the Hall IC 63 from above and below. The Hall IC 63 detects a movement of the shift rod 57 in accordance with the shift operation on the shift lever 52. The lead wire 74 extends from a front end of the Hall IC 63 toward a control device (not shown).

The pair of protection portions 64 and 65 protect the Hall IC 63 from external forces from above and below. The Hall IC 63 protrudes outward in the vehicle width direction from the outer side surface 62 of the sensor main body 61, and the pair of protection portions 64 and 65 are increased in protruding amounts from an upper portion and a lower portion of the sensor main body 61 toward an outer side in the vehicle width direction as coming close to the Hall IC 63. That is, an outer surface of the upper protection portion 64 is inclined downward toward the outer side in the vehicle width direction, and an outer surface of the lower protection portion 65 is inclined upward toward the outer side in the vehicle width direction. Even when an external force is applied to the protection portions 64 and 65 from above or below by a foot of a driver, the external force is deflected outward in the vehicle width direction, and the Hall IC 63 is effectively protected.

As shown in FIGS. 6 and 7, a holding portion 67 that holds the shift shaft 51 and a fastening boss 68 that is continuous with a front side of the holding portion 67 are provided at an inner side of the sensor main body 61 in the vehicle width direction in an inner side surface view. An opening is formed in the holding portion 67 at a substantially central position of the sensor main body 61 in a vehicle side view, and a female serration 69 is attached to the opening A slit 71 is formed so as to divide the fastening boss 68 from a fitting hole of the female serration 69 toward an outer side in a radial direction. With a straight line S on the slit 71 interposed therebetween, lower portion of the holding portion 67 and the fastening boss 68 is coupled to an inner side surface 66 of the sensor main body 61, and upper portion of the holding portion 67 and the fastening boss 68 is separated from the inner side surface 66 of the sensor main body 61.

A male serration of the shift shaft 51 is inserted into the female serration 69, and a tip end of the shift shaft 51 is brought into contact with a contact surface 72 of the sensor main body 61 so as to position the shift shaft 51. The contact surface 72 of the sensor main body 61 is one step higher than the inner side surface 66 of the sensor main body 61. The fastening boss 68 extends to a lower end of the sensor main body 61, and a bolt 73 is fastened to the fastening boss 68 from a lower side of the fastening boss 68. When the bolt 73 is fastened to the fastening boss 68, a slit width is narrowed, and the shift shaft 51 is held by the female serration 69 of the holding portion 67. Accordingly, the shift sensor 60 is attached to the shift shaft 51 so as to be integrally rotatable with the shift shaft 51.

Since the bolt 73 is fastened from a lower side of the vehicle by a tool, a tool line is ensured without affecting a layout of other components such as the water pump 44. In a non-operated state of the shift device 50 (the shift lever 52), the shift sensor 60 is inclined such that a front side of a lower end of the shift sensor 60 is positioned above a rear side thereof. That is, the shift sensor 60 is slightly inclined rearward about the shift shaft 51. As described above, since the fastening boss 68 is formed at a front side of the shift sensor 60, it is easy to see a head portion of the bolt 73 from the front side, and the bolt 73 is easily fastened to the fastening boss 68.

The front end of the shift rod 57 is coupled to the upper portion of the sensor main body 61 via the joint 59. In this manner, the shift shaft 51 is held at a substantially central portion of the sensor main body 61, and the shift rod 57 is coupled to the upper portion of the sensor main body 61, so that the sensor main body 61 functions as a link arm that couples the shift shaft 51 and the shift rod 57. Since the shift sensor 60 is not provided on the shift rod 57, it is not necessary to ensure a long shift rod 57 in order to attach the shift sensor 60. Since the shift sensor 60 is used instead of a link arm, the number of components is suppressed from increasing, and the shift sensor 60 is easily attached.

As shown in FIGS. 5 and 6, in the shift lever 52, the long arm 53 extends obliquely downward toward a front side from the attachment portion 55 serving as a swing fulcrum, and the short arm 54 extends substantially downward from the attachment portion 55. The long arm 53 extends toward a lower end of the shift sensor 60, and the operation portion 56 at a tip end of the long arm 53 is positioned at a rear side of the shift sensor 60. The shift rod 57 extends from the joint 58 at a tip end of the short arm 54 to the joint 59 at an upper portion of the shift sensor 60. The long arm 53 crosses an outer side of the shift rod 57 in the vehicle width direction, and the long arm 53 and the shift rod 57 obliquely intersect with each other.

In a non-operated state of the shift lever 52, inclination of the short arm 54 substantially coincides with inclination of the shift sensor 60. The shift rod 57 extends in a direction orthogonal to the inclination of the short arm 54 and the shift sensor 60, and a distance L1 from a front end of the shift sensor 60 to a front end of the operation portion 56 in an extending direction of the shift rod 57 is equal to or less than half of a length L2 of the shift rod 57. Accordingly, the operation portion 56 is brought close to the shift sensor 60, and a front-rear length of the shift device 50 is reduced. Since the front-rear length of the shift device 50 is reduced, a step position is not biased in the front-rear direction, and a riding position of the driver is not impaired.

In a vehicle side view, the operation portion 56 and the shift sensor 60 are provided below the shift rod 57, and the operation portion 56 and a lower portion of the shift sensor 60 are positioned at the same height. As a result, the operating portion 56 is not positioned too low, and a bank angle can be easily ensured. Since the shift sensor 60 is disposed below the shift rod 57, the shift shaft 51 that rotates integrally with the shift sensor 60 is separated from the drive shaft 43 (see FIG. 3) of the transmission device. Therefore, the degree of freedom of a shaft arrangement of the transmission device is improved, the shift device 50 is separated from a drive chain, and it is easy to arrange the sprocket cover 29 (see FIG. 1).

In a vehicle side view, the attachment portion 55 of the shift lever 52 is provided above the shift rod 57, and the attachment portion 55 and an upper portion of the shift sensor 60 are positioned at the same height. A rear end of the shift rod 57 is positioned below a front end of the shift rod 57, and the joint 58 at the rear end of the shift rod 57 is positioned at the same height as a lower portion of the shift sensor 60 and the operation portion 56. Since the shift lever 52 and the shift rod 57 are accommodated in a range from the upper portion to the lower portion of the shift sensor 60, a height of the shift device 50 is reduced. The long arm 53 extends obliquely from the attachment portion 55 toward the operation portion 56, and a sufficient length of the shift lever 52 is ensured.

In this manner, the shift lever 52 and the shift rod 57 are disposed in a compact manner so as to intersect with each other, so that a front-rear length and a height of the shift device 50 are reduced, and the shift device 50 is reduced in size. The operation portion 56, the lower portion of the shift sensor 60, and the joint 58 at the rear end of the shift rod 57 do not need to be positioned at completely the same height. A slight deviation may be generated to such an extent that these heights are considered to be the same height. Similarly, the attachment portion 55 and the upper portion of the shift sensor 60 do not need to be positioned at completely the same height. A slight deviation may be generated to such an extent that these heights are considered to be the same height.

As described above, according to the present embodiment, the shift sensor 60 has a function of detecting a shift operation, and the shift sensor 60 functions as a link arm that couples the shift shaft 51 and the shift rod 57. Even in a layout in which a sufficient length of the shift rod 57 cannot be ensured, the shift sensor 60 can be provided in the shift device 50. Since the shift sensor 60 and the operation portion 56 are positioned below the shift rod 57, the shift lever 52 and the shift rod 57 are disposed in a compact manner in the same space, and the shift device 50 is reduced in size. In addition, since the shift sensor 60 is provided instead of a link arm, the number of components is suppressed from increasing, and the shift sensor 60 is easily attached.

Although the operation portion and the shift sensor are positioned below the shift rod in the present embodiment, the operation portion and the shift sensor may be positioned at the same side in a manner of sandwiching the shift rod. For example, the operation portion and the shift sensor may be positioned above the shift rod.

Although the Hall IC is used as a sensor portion in the present embodiment, the sensor portion is not limited to the Hall IC. The sensor portion may be, for example, an anisotropic magneto resistive (AMR) sensor as long as the sensor portion can detect a movement of the shift rod.

Although the shift sensor is provided with a pair of protection portions that protect the sensor portion from external forces from above and below in the present embodiment, the shift sensor may be provided with one protection portion so as to protect the sensor portion from external forces at least one of from above and from below. Further, the shift sensor may not be provided with a protection portion.

Although the shift sensor is inclined rearward such that the front side of the lower end of the shift sensor is positioned above the rear side thereof in the present embodiment, the shift sensor may not be inclined, and the shift sensor may be inclined forward.

Although the operation portion, the lower portion of the shift sensor, and the rear end of the shift rod are positioned at the same height in the present embodiment, a positional relationship among the operation portion, the lower portion of the shift sensor, and the rear end of the shift rod is not particularly limited.

Although the attachment portion of the shift lever and the upper portion of the shift sensor are positioned at the same height in the present embodiment, a positional relationship between the attachment portion of the shift lever and the upper portion of the shift sensor is not particularly limited.

Although the distance from the front end of the shift sensor to the front end of the operation portion in the extending direction of the shift rod is equal to or less than half of the length of the shift rod in the present embodiment, the distance from the front end of the shift sensor to the front end of the operation portion is not particularly limited. As long as the length of the shift lever can be ensured, the distance from the front end of the shift sensor to the front end of the operation portion may be larger than half of the length of the shift rod.

Although the shift sensor is provided on the shift shaft so as to be integrally rotatable with the shift shaft in the present embodiment, the integrally rotatable configuration is not limited to a configuration in which rotation is transmitted from the shift shaft to the shift sensor without a play. The integrally rotatable configuration may be a configuration in which rotation is transmitted from the shift shaft to the shift sensor with a play of a predetermined rotation amount.

The shift device may be applied not only to the straddle-type vehicle shown in the drawings but also to a straddle-type vehicle of other types. The straddle-type vehicle is not limited to general vehicles on which a rider rides in a posture of straddling a seat, and also includes a small-sized scooter-type vehicle on which a rider rides without straddling a seat.

As described above, the shift device (50) according to the present embodiment is a shift device for a straddle-type vehicle (1) that is configured to cause a transmission device to perform a shift change in accordance with rotation of a shift shaft (51). The shift device (50) includes a shift lever (52) provided with an operation portion (56) that is configured to receive a shift operation, a shift sensor (60) provided on the shift shaft so as to be integrally rotatable with the shift shaft, and a shift rod (57) that couples the shift lever and the shift sensor. The shift sensor is configured to detect the shift operation on the shift lever in accordance with a movement of the shift rod, and the operation portion and the shift sensor are positioned at the same side in a manner of sandwiching the shift rod in a vehicle side view. According to this configuration, the shift sensor has a function of detecting the shift operation, and the shift sensor functions as a link arm that couples the shift shaft and the shift rod. Even in a layout in which a sufficient length of the shift rod cannot be ensured, the shift sensor can be provided in the shift device. Since the shift sensor and the operation portion are positioned at the same side in a manner of sandwiching the shift rod, the shift lever and the shift rod are disposed in a compact manner in the same space, and the shift device is reduced in size. In addition, since the shift sensor is provided instead of a link arm, the number of components is suppressed from increasing, and the shift sensor is easily attached.

In the shift device according to the present embodiment, the operation portion is positioned at a rear side of the shift sensor in the vehicle side view, and a distance from a front end of the shift sensor to a front end of the operation portion in an extending direction of the shift rod is equal to or less than half of a length of the shift rod. According to this configuration, since the operation portion is brought close to the shift sensor, a front-rear length of the shift device can be reduced. Since the front-rear length of the shift device is reduced, a step position is not biased in the front-rear direction, and a riding position of a driver is not impaired.

In the shift device according to the present embodiment, the shift rod extends in a front-rear direction, and the operation portion and the shift sensor are positioned below the shift rod. According to this configuration, a height of the shift device can be reduced. Since the shift sensor is disposed below the shift rod, the shift shaft that rotates integrally with the shift sensor is separated from a drive shaft (43) of the transmission device. Therefore, the degree of freedom of a shaft arrangement of the transmission device is improved, the shift device is separated from a drive chain, and it is easy to arrange a sprocket cover (29).

In the shift device according to the present embodiment, the operation portion and a lower portion of the shift sensor are positioned at the same height. According to this configuration, a height of the shift device can be reduced. The shift device is not positioned too low, and a bank angle can be easily ensured.

In the shift device according to the present embodiment, an attachment portion (55) of the shift lever to a vehicle is positioned above the shift rod, and the attachment portion of the shift lever and an upper portion of the shift sensor are positioned at the same height. According to this configuration, a height of the shift device can be reduced. The shift lever extends obliquely downward from the attachment portion toward the operation portion, and a sufficient length of the shift lever is ensured.

In the shift device according to the present embodiment, one end of the shift rod is coupled to an upper portion of the shift sensor, the other end of the shift rod is positioned below the one end of the shift rod, and a lower portion of the shift sensor and the other end of the shift rod are positioned at the same height. According to this configuration, the shift rod is accommodated in a range from the upper portion to the lower portion of the shift sensor, and the height of the shift device can be reduced.

In the shift device according to the present embodiment, a water pump (44) is disposed in a manner of covering the shift sensor from a front side. According to this configuration, the shift sensor can be protected from flying objects such as flying stones from the front side.

Although the present embodiment has been described, the embodiment described above and modifications may be combined entirely or partially as other embodiment.

The technique of the present invention is not limited to the embodiment described above, and various changes, substitutions, and modifications may be made without departing from the spirit of the technical concept of the present invention. The present invention may be implemented using other methods as long as the technical concept can be implemented by the methods through the advance of the technology or other derivative technology. Therefore, the claims cover all embodiments that may be included within the scope of the technical concept.

What is claimed is:

1. A shift device for a straddle-type vehicle that is configured to cause a transmission device to perform a shift change in accordance with rotation of a shift shaft, the shift device comprising:
    a shift lever provided with an operation portion that is configured to receive a shift operation;
    a shift sensor provided on the shift shaft so as to be integrally rotatable with the shift shaft; and
    a shift rod that couples the shift lever and the shift sensor,
    wherein the shift sensor is configured to detect the shift operation on the shift lever in accordance with a movement of the shift rod, and
    wherein the shift rod extends in a front-rear direction, and the operation portion and the shift sensor are positioned below the shift rod.

2. The shift device according to claim 1,
    wherein the operation portion is positioned at a rear side of the shift sensor in a vehicle side view, and a distance from a front end of the shift sensor to a front end of the operation portion in an extending direction of the shift rod is equal to or less than half of a length of the shift rod.

3. The shift device according to claim 1,
    wherein the operation portion and a lower portion of the shift sensor are positioned at the same height.

4. The shift device according to claim 1,
    wherein an attachment portion of the shift lever to a vehicle is positioned above the shift rod, and
    wherein the attachment portion of the shift lever and an upper portion of the shift sensor are positioned at the same height.

5. The shift device according to claim 1,
    wherein one end of the shift rod is coupled to an upper portion of the shift sensor, and
    wherein the other end of the shift rod is positioned below the one end of the shift rod, and a lower portion of the shift sensor and the other end of the shift rod are positioned at the same height.

6. A straddle-type vehicle comprising:
    the shift device according to claim 1, and
    a water pump disposed in a manner of covering the shift sensor from a front side.

* * * * *